June 3, 1952 — E. W. JONES ET AL — 2,599,458
AUTOMATIC CONTROL FOR WELLS
Filed Oct. 19, 1949 — 2 SHEETS—SHEET 1
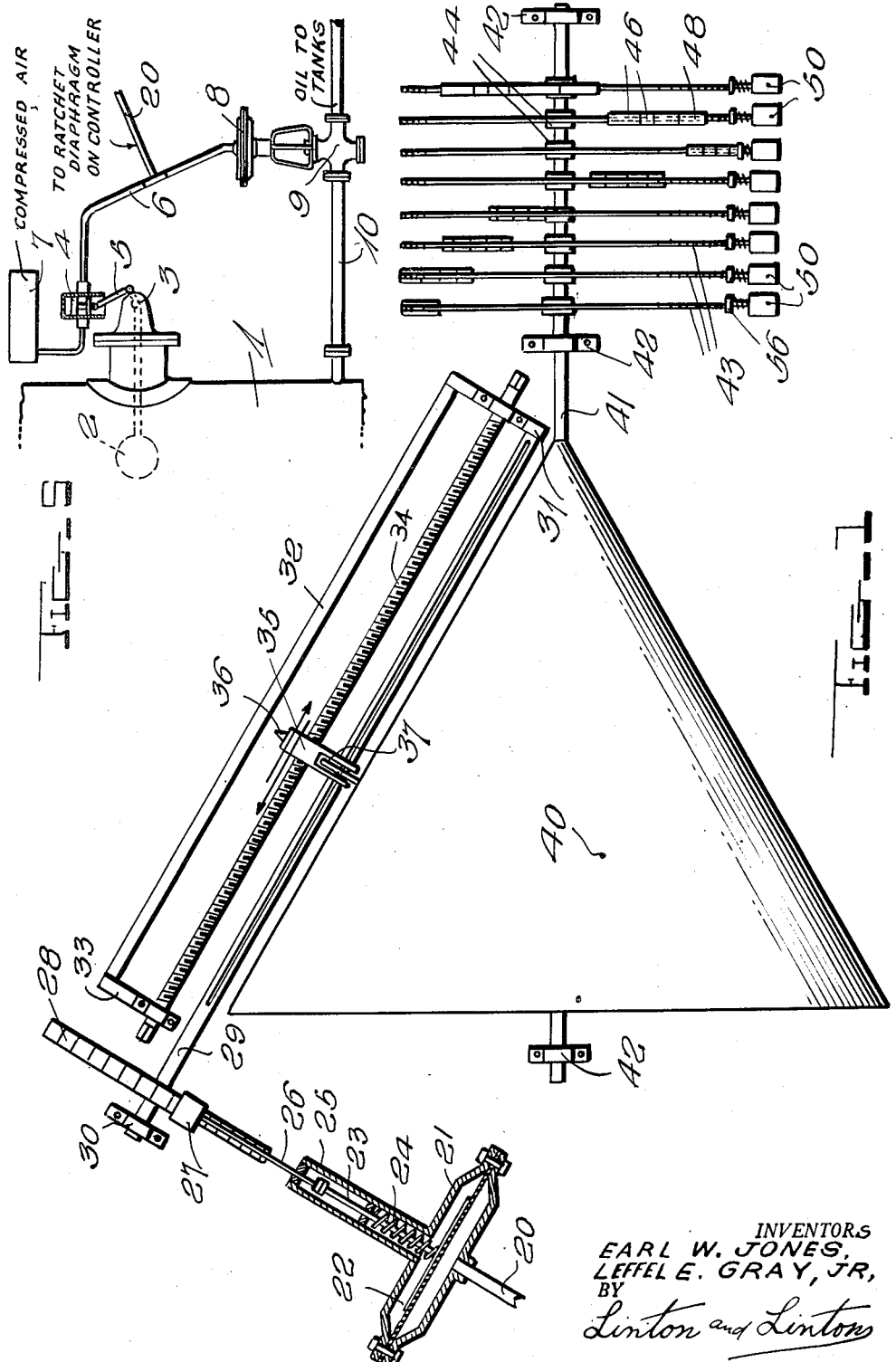
INVENTORS
EARL W. JONES,
LEFFEL E. GRAY, JR,
BY
Linton and Linton
ATTORNEYS

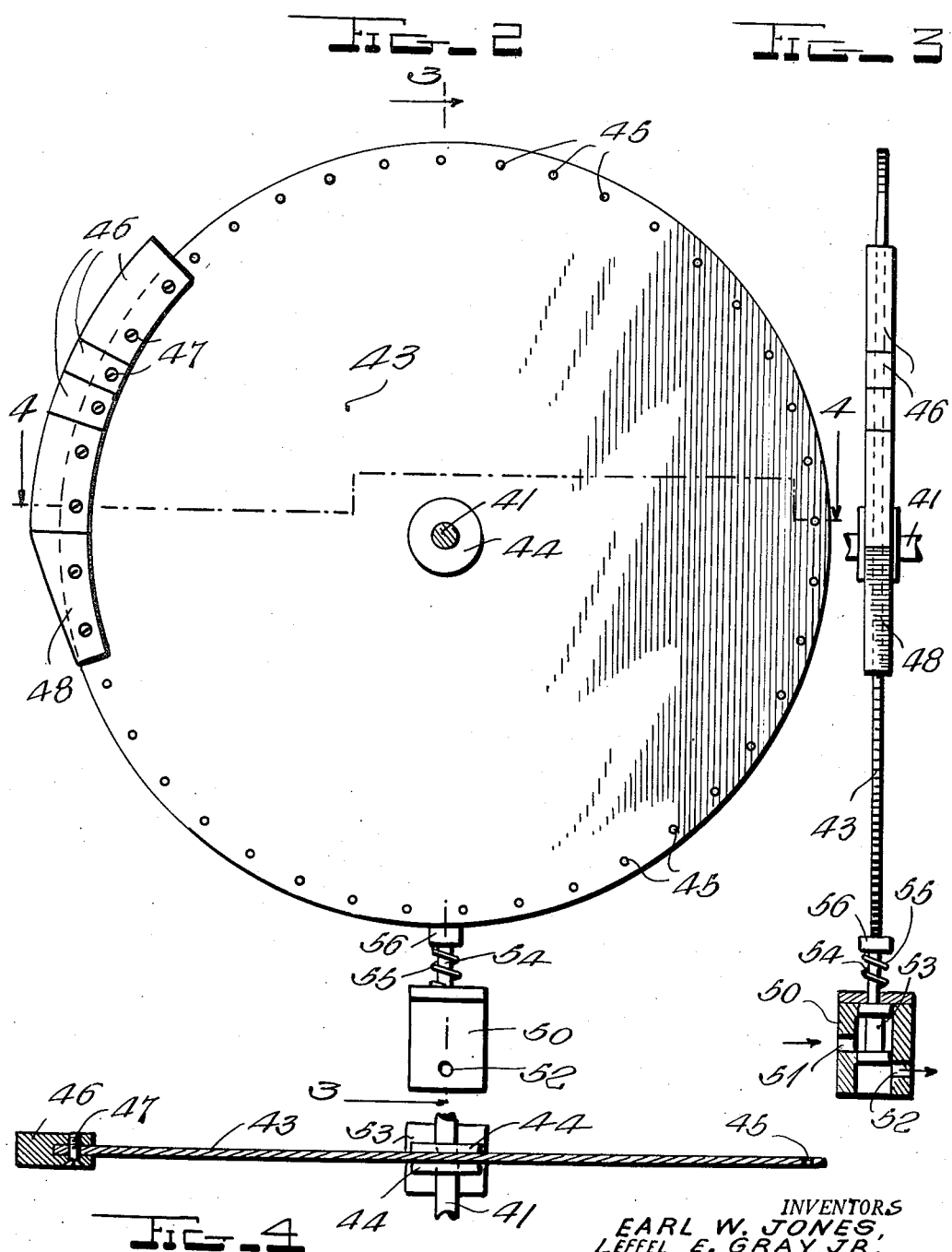

UNITED STATES PATENT OFFICE 2,599,458

AUTOMATIC CONTROL FOR WELLS

Earl Wooten Jones, Abilene, and Leffel Ewing Gray, Jr., Granger, Tex.

Application October 19, 1949, Serial No. 122,294

12 Claims. (Cl. 137—78)

The present invention pertains to apparatuses for controlling the production, that is, flow or artificial lift, of fluid from a series of wells to a common storage and more particularly is concerned with providing a controller for automatically governing the production of liquid petroleum from crude oil or distillate wells with each well permitted to supply a desired proportion of the total fluid going to the common storage container.

At the present time crude oil issuing from a well must be separated into its liquid and gaseous components. For this purpose there are various types of crude oil separators in use with their basic arrangement consisting of a tank having a float operated valve outlet for the oil and an outlet for the gas which naturally rises to the top. When a given amount of oil has been introduced into the tank, the float will be raised thereby and through this action a release valve permitting the oil to flow from the tank is operated. The control through which the float valve operates the release valve takes many forms, such as connected levers attached to each valve; a compressed air or gas line having a slide valve operated by said float for releasing the compressed gas to a diaphragm which in turn is mechanically connected to the release valve; a mercoid switch containing a mercury switch control connected to a lever operated by said float and said switch upon being tilted, will open or close an electrical circuit which in turn operates the release valve; a liquid and gas separator as shown in Patent No. 2,211,282 including a valve 18 operated by a diaphragm 18a receiving pressure from diaphragm 19a and which pressure is controlled by the movement of float 38 in the oil chamber 11 and the released oil measured or metered by a conventional counter 70 connected to said line 35; and conventional separators employ known types of meters which measure the amount of fluid in predetermined measurements as the liquid flows from the separator.

The present controller is designed to be operated from the various types of known separators for crude oil or liquid meters by utilizing the motion of the float valve in the separator or the counter in the liquid meter both of which function upon each delivery of a given measure of fluid. Thus the present device can be employed to function by utilizing each release of gas by the float travel, release of electrical current where current is employed, or by a mechanical lever where the connection between the float and release valve in the separator is through connected levers.

The principal object of the present invention is to provide an automatic control for a series of wells having a common metering device and storage which control is operated by measured volumes of fluid coming from the wells.

A further and important object of the invention is to provide a controller for a series of wells which permits a given amount of fluid from each well and which amount of fluid can be varied as desired.

A still further object of the invention is to provide a controller for a series of crude oil wells for permitting the petroleum separated therefrom to be introduced to a common storage or disposal device and which controller is operated from the separator or other metering device of the petroleum.

Referring to the accompanying drawings:

Fig. 1 is a side elevation of a controller for a series of wells in accordance with the present invention.

Fig. 2 is a side elevation of a cam and valve forming a part of the controller.

Fig. 3 is an end elevation taken on line 3—3 of Fig. 2.

Fig. 4 is a top cross sectional view taken on line 4—4 of Fig. 2.

Fig. 5 is a schematic view of a power take off from a separator for operating the present controller.

Referring now more particularly to the accompanying drawings in which like and corresponding parts are indicated by similar reference characters, numeral 1 indicates a tank of a known crude oil or distillate separator having a float 2 extending therein and pivotally supported at 3. The pivot 3 is connected to a piston valve 4 by a pivoted connecting arm 5. Said valve 4 is interposed in pipe line 6 for closing or opening the same for controlling the admission of compressed air from chamber 7. Line 6 is connected to a diaphragm chamber 8 which in turn operates release valve 9 for controlling the flow of fluid from tank 1 through pipe 10 to tanks or other disposal devices. The aforementioned arrangement is that commonly employed in conventional separators and is referred to as one example of the arrangements used for dumping petroleum in given volumes from said separators.

A tube 20 is connected to line 6 as a power take off for operating the controller shown in Fig. 1 of the drawings. Said tube 20 is connected to a diaphragm housing 21 having a diaphragm 22 positioned therein and supporting a rod 23. Said diaphragm 22 is resiliently held in an intermediate position within housing 21 by means of a coil spring 24 surrounding said rod 23. A second rod 26 extends through housing 21 for contacting and being operated by said rod 23. The free end of rod 26 has a ratchet 27 mounted thereon which can engage ratchet wheel 28 upon each movement of rod 26.

Said ratchet wheel 28 is fixedly mounted upon a drive shaft 29 rotatably supported by bearings 30 and 31. Parallel with shaft 29 there is positioned a scale 32 supported by bearings 31 and 33 having a rotatable screw rod 34. Said screw rod 34 has an internally threaded carrier 35 mounted thereon with the threads of both members in engagement. Said carrier 35 supports a pointer 36 for indicating the relative position of carrier 35 along said scale 32.

At the opposite forked end of carrier 35 there is positioned a drive wheel 37 longitudinally slidable upon drive shaft 29 but keyed thereto for rotation therewith.

Said drive shaft 29 extends parallel to a cone 40 and is positioned relative thereto for causing wheel 37 to frictionally engage the periphery of said cone 40. The cone 40 is rotatably supported by a drive shaft 41 rotatably mounted in bearings 42.

Also fixedly mounted upon said shaft 41 is a series of discs 43 having said shaft 41 extending through the centrally located hub 44.

Each of said discs 43 has an annular series of openings 45 formed through the same and adjacent the edge thereof. Positioned upon said edge of each disc 43 are group cam components 46 and having substantially U-shaped cross sections for fitting over the edge of the disc 43 and being fastened thereto by screws 47 extending through openings 45. These components 46 are of different lengths for being arranged to provide a cam surface of various lengths while the lead component 48 tapers to the periphery of disc 43.

Positioned beneath each disc 43 is a valve 50 having an entrance opening 51 and an offset diametrically opposite outlet opening 52. Slidable within the bore of the valve is a valve piston 53 connected to a rod 54 extending through said valve. Rod 54 has a coil spring 55 extending therearound bearing against valve 50 and head 56 for normally retaining piston 53 at the upper end of the housing and thus closing said openings 51 and 52.

In the field of oil wells it is desirable to conduct the crude oil to a gas and petroleum separator and thereafter pass the petroleum in predetermined volumes to a single storage tank. It is further desirable to obtain varying quantities of the petroleum from each of the wells. In order that this can be accomplished, the present controller is introduced into the system between the separator or other metering device and the storage tanks for controlling automatically the production of fluid from each well in proportionate amounts. Thus as indicated by way of example only in Fig. 5, the compressed air introduced in line 6 upon float 2 reaching a predetermined level and opening valve 4, is used to introduce compressed air into line 20. Thus air enters line 20 only when a measured quantity of liquid has entered tank 1 and is dumped therefrom through line 10 upon the simultaneous opening of valve 9. Each time the air is thus introduced into line 6 it also passes through line 20 for operating the controller.

In the present example the air from line 20 enters housing 21 and moves diaphragm 22 upwardly against spring 24 which spring returns the diaphragm when the pressure thereagainst is relieved. This movement of diaphragm 22 in turn moves rods 23 and 26 causing ratchet 27 to move against wheel 28 for giving the same a partial turn. In turn, wheel 28 revolves shaft 29, drive wheel 37 and thereby rotates cone 40, shaft 41 and discs 43.

The drive wheel 37 being of a much smaller diameter than cone 40 provides a speed reducer which can be varied by rotating screw shaft 34 which will cause carriage 35 to move parallel of said cone. The ratio between wheel 37 and cone 40 can be indicated upon a suitable preconceived scale 32.

Each movement of cone 40 will through shaft 41 cause the discs 43 to turn and when the cam components 46 and 48 bear upon the head 56 of the corresponding valve, causes the valve to be opened until the end of the cam surface is reached. When valve 50 is opened it can permit petroleum to flow therethrough from the well with which it is associated and from there to the metering device or it may permit compressed air to flow to the usual gas operated motor valves on the well flow line.

The components 46 are of different lengths and are detachably mounted in order that they may be combined upon each disc to form a portion of the total circle of that disc. The cam surfaces are thus arranged so that each cam forms a desired portion of the entire circle for all discs whereby each valve 50 will be held open to permit the desired amount of fluid to be produced from its corresponding well.

The speed of operation is dependent upon the rate at which an individual well is allowed to produce. Thus each time a predetermined measure of fluid enters the storage tank, ratchet 27 is operated and likewise drive wheel 37 and cone 40. Thus the movement of the discs 43 is controlled by the amount of measured fluid passed to storage.

Inasmuch as ratchet 27 will contact one tooth of wheel 28 during each movement, it is necessary to employ a wheel having a given number of teeth and to set the speed reducer at a given ratio between said drive wheel and said cone. As for example, when the controller is employed in a field of eight wells having a common storage, there will be required eight discs 43 and the valves 50, providing one for each well. Supposing the wells are permitted to flow as follows:

| Well No. | | |
|---|---|---|
| 1 | 100 | barrels |
| 2 | 125 | barrels |
| 3 | 150 | barrels |
| 4 | 135 | barrels |
| 5 | 110 | barrels |
| 6 | 95 | barrels |
| 7 | 145 | barrels |
| 8 | 140 | barrels |
| Total | 1,000 | barrels per day | and the separator is adjusted to dump ½ barrel at a time, while the ratchet wheel 28 is formed with 100 teeth, then the proportionate part of the total circle formed by discs 43 required for each cam 46 and 48 can be determined as follows:

Well No. 1 ---- 100/1000—10.0% of total circle
2 ---- 125/1000—12.5% of total circle
3 ---- 150/1000—15.0% of total circle
4 ---- 135/1000—13.5% of total circle
5 ---- 110/1000—11.0% of total circle
6 ----  95/1000— 9.5% of total circle
7 ---- 145/1000—14.5% of total circle
8 ---- 140/1000—14.0% of total circle 100.0% of circle With the metering device or separator 1 set to dump ½ barrel of fluid at a time, it will operate 2000 times before the day's output of 1000 barrels is completed. At the same time the ratchet gear 28 will be caused to turn 20 times and in order that the discs 43 will make one complete turn in that time, the ratio between the drive wheel 37 and cone 40 should be adjusted to 20 to 1 by rotating screw shaft 34 and thus moving carriage 35 to the position required. As the cam for each disc 43 will open valve 50 when the cam is passing over the head 56, the well will be permitted to flow for the percentage of the total output desired from that particular well. The cams being each offset relative to one another or to certain of the other cams will thus cause a different well or wells to flow at a time and there will be a continuous supply of fluid to the metering device and storage tank. Regulating the flow of oil to the metering device will control the period of operation for each cycle of the controller and if desired, the device can therefore be set for continuous twenty-four hour operation.

The arrangement described herein is by way of example only and is capable of considerable modification by substituting mechanical equivalents, but such changes thereto as come within the scope of the appended claims is deemed to be a part of the invention.

We claim:

1. A flow controller for a series of wells comprising means for metering in predetermined measures the fluid from said wells, control means for releasing desired amounts of fluid from each of said wells at a time, and a variable reduction drive operatively connecting said metering means to said means for controlling the production of liquid.

2. A flow controller for a series of wells comprising control means for releasing desired amounts of fluid from each of said wells at a time, a variable speed drive connected to said control means for operating the same, a fluid metering device for said wells and means operatively connecting said drive to said metering device.

3. A flow controller for a series of wells having a common metering device and storage of the fluid therefrom, comprising valves for controlling the production of fluid from said wells, and means connected to said metering device for being operated thereby upon each passage of a predetermined amount of fluid through said metering device and contacting said valves for opening each valve thereof separately and for a given volume.

4. A flow controller for a series of wells having a common storage for the fluid therefrom comprising means for metering in predetermined measures the fluid from said wells, a variable speed reduction drive connected to said metering means for being operated thereby upon each passage of a predetermined amount of fluid through said metering device and means for proportioning the production of fluid from each well operatively connected to said drive.

5. A proportionate flow controller for a series of wells comprising means for metering in predetermined measures the fluid from said wells, a series of valves each controlling the production of liquid from one of said wells, a series of changeable cams rotatably supported and each operatively contacting one of said valves, a variable speed reducer connected to said cams for rotating the same, and a drive for said speed reducer connected to said metering means for being operated thereby upon the passing of each measure of fluid.

6. A proportionate flow controller for a series of wells having a common storage comprising means for metering in predetermined measures the fluid from said wells to said storage, a series of valves each controlling the production from one of said wells, rotary means for opening each valve through a given portion of the circle formed by the rotation thereof, and a drive connecting said metering means to said rotary means for rotating the same upon the production of each measure of fluid.

7. A flow controller for a series of wells having a common storage and metering device comprising a series of valves each controlling the flow of fluid from one of said wells, rotary means for opening each valve through a given portion of the circle formed by the rotation thereof, a rotary variable speed reducer connected to said rotary means for rotating the same, a drive shaft connected to said speed reducer for rotating the same, a ratchet fixedly mounted on said shaft, and means for operating said ratchet from said metering device upon the production of each measure of fluid.

8. A flow controller for a series of wells having a common storage and metering device comprising means controlling the production of fluid from each of said wells, a rotary cam for opening said controlling means of each well through a given portion of the circle formed thereby, a driven shaft having said cam mounted thereon, a variable speed reducer connected to said shaft, a drive shaft for said speed reducer and means for operating said drive shaft from said metering device upon the production of each measure of fluid.

9. A flow controller for a series of wells having a common storage and metering device comprising a series of valves each controlling the production of fluid from one of said wells, a series of rotary cams each for opening one of said valves through a given portion of the circle formed by the series of cams, a variable speed reducer connected to said cams for rotating the same, means for varying the ratio of said speed reducer, and means for operating said speed reducer from said metering device upon the production of each measure of fluid.

10. A flow controller for a series of wells having a common storage and metering device comprising a series of valves each controlling the production of fluid from one of said wells, a series of discs rotatably supported, changeable cams provided on the periphery of said discs with each cam forming a separate arc of the circle formed by said discs, a variable speed reducer connected to said discs for rotating the same and means for operating said speed reducer from said metering device upon the production of each measure of fluid.

11. A flow controller for a series of wells having a common storage and metering device comprising a series of valves each controlling the production of fluid from one of said wells, a series of changeable cams each formed for contacting one of said valves and opening the same for providing a predetermined production of fluid, a variable speed reducer connected to said cams for operating the same, a ratchet connected to said speed reducer, and means for operating said ratchet from said metering device upon the flow of each measure of fluid.

12. A flow controller for a series of wells having a common storage and metering device comprising means controlling the production of fluid from each well, cams for operating said valves, a driven shaft rotatably supporting said cams, a speed reducer operatively connected to said shaft, a drive shaft connected to said speed reducer for driving the same, a ratchet wheel fixedly mounted on said drive shaft, a ratchet contacting said wheel for moving the same, a shaft for said ratchet and means for moving said shaft from said metering device upon production of a predetermined measure of fluid.

EARL WOOTEN JONES.
LEFFEL EWING GRAY, Jr.

REFERENCES CITED

The following references are of record in the file of this patent:

UNITED STATES PATENTS

| Number | Name | Date |
| --- | --- | --- |
| 1,874,932 | Dow | Aug. 30, 1932 |
| 1,932,024 | Stuckey | Oct. 24, 1933 |
| 1,992,877 | Monthan | Feb. 26, 1935 |

FOREIGN PATENTS

| Number | Country | Date |
| --- | --- | --- |
| 264,396 | Great Britain | of 1927 |
| 327,739 | Great Britain | of 1930 |